United States Patent
Dabecki et al.

[11] Patent Number: 6,088,369
[45] Date of Patent: Jul. 11, 2000

[54] LINE CODING TECHNIQUE FOR EFFICIENT TRANSMISSION AND DELINEATION OF ENCAPSULATED FRAMES OVER HIGH SPEED DATA LINKS

[75] Inventors: Stephen Dabecki, Port Moody; Brian Gerson, Coquitlam; Barry Hagglund, Port Coquitlam; Charles Kevin Huscroft, Port Moody; Vernon R. Little, Belcarra, all of Canada

[73] Assignee: PMC-Sierra Ltd., Canada

[21] Appl. No.: 08/865,736

[22] Filed: May 30, 1997

[51] Int. Cl.[7] .................................................. H04J 3/06
[52] U.S. Cl. .................................................. 370/503
[58] Field of Search .................................. 370/466, 476, 370/488, 276, 291, 265, 401, 468, 389, 441, 342, 347, 503, 332, 333, 335, 336, 350, 465, 440, 518, 506, 509, 512, 513; 375/286, 293, 352, 355, 356, 365, 366; 341/50–53, 56, 59–60, 63, 84

[56] References Cited

U.S. PATENT DOCUMENTS

| | | | |
|---|---|---|---|
| 4,926,472 | 5/1990 | Batruni et al. | 370/291 |
| 5,257,270 | 10/1993 | Hilden et al. | 341/59 |
| 5,301,187 | 4/1994 | Reum | 370/276 |
| 5,878,221 | 3/1999 | Szkopek et al. | 370/488 |

OTHER PUBLICATIONS

PMC–Sierra, Inc. Document No. PMC–960837 "Physical Layer Proposal for 1 Gbit/s Full/Half Duplex Ethernet Transmission over Single (4–pair) or Dual (8–pair) UTP–5 Cable" Nov. 11–14, 1996.

PMC–Sierra, Inc. Document No. PMC–961008 "PCS Mapping using 4LZS codes" Sep., 1996.

*Primary Examiner*—Dang Ton
*Attorney, Agent, or Firm*—Graham & James LLP

[57] ABSTRACT

According to the invention there is provided a method of signal coding that permits high speed data transmission over multiple pairs of UTP-5 cable from a transmission end to a receiving end which includes, at the transmission end, separating an incoming frame of data into a plurality of byte streams with a predefined sequence of bytes assigned to each of the streams, encoding every 2 bits of data in each stream into one of 4 logical voltage levels forming a symbol or quat thereby reducing the symbol or baud rate by 50% and inserting an escape sequence into one or more of the streams consisting of a sequence of zero's followed by a control code to indicate a transition from one state to another. At a receiving end, the method further includes reading the escape sequence and decoding the signals in accordance with the code contained in the escape sequence.

18 Claims, 4 Drawing Sheets

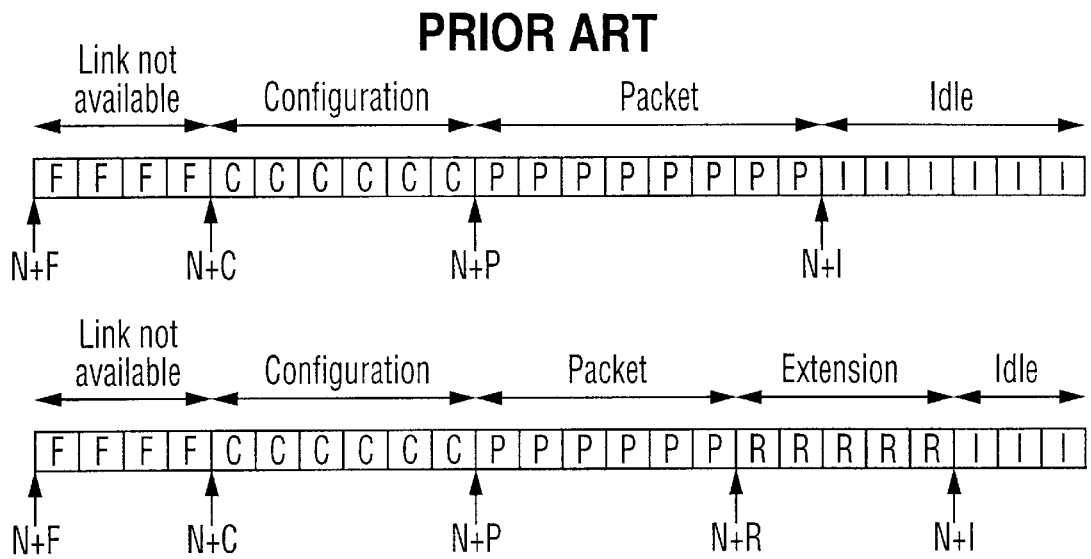

FIG. 3 PRIOR ART

| Physical Code | Function | 4LZS Control Byte Encoding (NULL, C1, C2, C3, C4) | | | | | | | |
|---|---|---|---|---|---|---|---|---|---|
| N+F | Start of "F" | 0 | 0 | 0 | 0 | +3 | −3 | +3 | −3 |
| F | Link Not Available | −3 | −3 | −1 | −1 | +1 | +1 | +3 | +3 |
| N+C | Start of "C" | 0 | 0 | 0 | 0 | +1 | +3 | −1 | −3 |
| C | Link Configuration | "16-bit Configuration Register" | | | | | | | |
| N+I | Start of idle (EOP, no ext) | 0 | 0 | 0 | 0 | −3 | −1 | +1 | +3 |
| I | Idle | −1 | +1 | +3 | +3 | +1 | −1 | −3 | −3 |
| N+P | Start of "P" (SOP) | 0 | 0 | 0 | 0 | +3 | +1 | −1 | −3 |
| P | Packet Data | "Packet Data" | | | | | | | |
| N+R | Start of "R" (EOP, with ext) | 0 | 0 | 0 | 0 | +1 | −1 | +1 | −1 |
| R | Carrier Extension | +3 | +3 | +1 | +1 | −1 | −1 | −3 | −3 |
| N+H | Start of "H" | 0 | 0 | 0 | 0 | +1 | −1 | +3 | −3 |
| H | Invalid Code | +3 | +1 | −1 | −3 | −3 | −1 | +1 | +3 |
| N+S11 | Substitute "11..." | 0 | 0 | 0 | 0 | −3 | +3 | +3 | −3 |
| N+S00 | Substitute "00..." | 0 | 0 | 0 | 0 | −3 | +3 | −3 | +3 |
| N+S01 | Substitute "01..." | 0 | 0 | 0 | 0 | −3 | +3 | +1 | −1 |
| N+S10 | Substitute "10..." | 0 | 0 | 0 | 0 | −3 | +3 | −1 | +1 |

FIG. 4

PRIOR ART

LINE CODING TECHNIQUE FOR EFFICIENT TRANSMISSION AND DELINEATION OF ENCAPSULATED FRAMES OVER HIGH SPEED DATA LINKS

FIELD

A line coding technique for efficient transmission and delineation of encapsulated frames over high speed data links.

BACKGROUND

When transmitting a data packet (frame) over a serialized channel, it is common to perform some kind of signal encoding prior to transmitting the data over the physical media. Some of the reasons for this encoding are as follows:

(a) To reduce the effective transmission rate by encoding the bit stream into symbols using a multi-level code. The resulting baud rate is thus reduced.

(b) To be able to identify start of frame characters uniquely from the data by the use of additional codepoints to allow start and end frame delineation ("framing").

(c) To improve error robustness by the use of additional codepoints.

(d) To enable the carrying of control data over the channel through the use of additional codepoints.

(e) To be able to map data so as to obtain an overall DC balance on a character by character basis by the use of additional codepoints.

The use of unshielded twisted pair transmission lines in existing buildings for local area networks (IAN's) and in other areas, has created a need for a technique that will allow the transmission of high speed serial bit streams containing data frames. At present there is a need for a method of coding a 500 Mbps serial bit stream containing data frames into an efficient physical layer stream for subsequent transmission over a single pair of Unshielded Twisted Pair (UTP). For example, transmission of such a stream over a Category 5 cable (UTP-5) twisted pair up to a distance of 50 meters is desired.

There are numerous problems in trying to transmit data at these rates using only unshielded twisted pairs (UTP-5) as the medium. These may be summarized as follows:

(a) signal degradation due to cross-talk between transmitter and receiver at one end or between transmitters at one end when two or more cables are used for transmission, (b) signal attenuation due to lossy medium, and (c) limitation of signal transmit launch power due to Federal Communications Commission (FCC) compliance.

Accordingly, it is an object of the invention to provide an efficient signal coding scheme that would allow high speed data transmission over multiple pairs of UTP-5 cable. It is a further object of the invention to provide a mechanism to detect the end of the data frame being transmitted, avoiding the overhead of using redundant symbols for carrying such end of frame indications. It is yet a further object of the invention to provide a mechanism to support the carrying of control information, avoiding the overhead of using redundant symbols for carrying such control information. Finally, it is an object of the invention to provide a mechanism to allow pattern substitution for runs exceeding the length of typical clock recovery circuits.

SUMMARY OF THE INVENTION

The method uses a 2 bit to 4 level coding scheme in order to reduce the effective symbol rate on the UTP-5 cable. This type of encoding is generally referred to as 2B1Q and has been used in other applications such as Narrowband Integrated Services Digital Networks (ISDN). The acronym 4LZS is also used to describe physical layer streams that have four levels and a zero state in the signals.

According to the invention there is provided a method of signal coding that permits high speed data transmission over multiple pairs of UTP-5 cable from a transmission end to a receiving end which includes, at the transmission end, separating an incoming frame of data into a plurality of byte streams with a predefined sequence of bytes assigned to each of said streams, encoding every 2 bits of data in each stream into one of 4 logical voltage levels forming a symbol or quat thereby reducing the symbol or baud rate by 50% and inserting an escape sequence into one or more of the streams consisting of a sequence of zero's followed by a control code to indicate a transition from one state to another. At a receiving end, the method further includes reading the escape sequence and decoding the signals in accordance with the code contained in the escape sequence.

Preferably, the escape sequence is inserted by overwriting bits of a frame being transmitted.

The escape sequence may include four zeros followed by four quats.

Advantageously, an incoming frame may be separated, on a byte-by-byte basis, with each successive byte assigned to a different stream than that to which the previous byte was assigned.

The escape sequence may be used to delineate a start of a frame from data in the frame itself. The escape sequence may also be used to delineate an end of a frame from data in the frame itself.

The escape sequence may be substituted in place of intervals of fixed quats where the interval of the sequence of transmission of fixed quats is sufficiently long so as to affect the recovery of clock recovery circuits or to cause significant baseline wander or both.

The frames of data may be Ethernet frames.

By using a 4 level scheme, the symbol rate is reduced to 250 MBaud. By limiting the signal transmit launch power of these symbols, and by specifying a maximum cable distance of 50 m, the power density spectrum can be controlled to meet FCC-B emission standards, whilst providing sufficient signal at the receiver to enable reception with a bit error rate (BER) of better than $10^{-10}$.

Some existing lower rate schemes use 4B5B (or 8B10B) block coding in order to convey extra signaling information. With this approach, 4 (or 8) bits of data are mapped to 5 (or 10) bit symbols, and hence additional codepoints are made available, but this introduces an overhead of 25%. At very high rates, such an overhead is unacceptable as it is normally required to reduce the rate of transmission on the line to allow for acceptable performance.

BRIEF DESCRIPTION OF THE DRAWINGS

Further features and advantages will be apparent from the following detailed description, given by way of example, of a preferred embodiment taken in conjunction with the accompanying drawings, wherein:

FIG. 3 is a schematic diagram of the Physical Layer Streams;

FIG. 4 is a table of possible mappings for the escape sequences defined not only for framing and link control, but also for the pattern substitution;

DETAILED DESCRIPTION WITH REFERENCE TO THE DRAWINGS

A data frame is transmitted over a single Unshielded Twisted Pair Category 5 (UTP-5) cable containing 4 pairs of wiring by using two pairs for transmit and two pairs for receive. The data rate transmitted on each pair is reduced by 50% by using a 4-level coding scheme, where every 2 bits of a data stream is encoded into one of 4 logical levels forming a symbol or quat. Thus the symbol or baud rate is reduced by 50%.

This method is applicable to IEEE 802.3 Ethernet and IEEE 802.8 Token Ring. Fiber Distributed Digital Interface (FDDI) frames could also employ this technique.

Ethernet Frame Structure

An Ethernet frame consists of an 8-byte preamble followed by 64 to 1518 bytes of data. Successive frames are transmitted with an inter frame (or packet) gap (IPG) of at least 12 bytes. The preamble carries no useful data and is used in early generation Ethernet systems. Accordingly, preamble bytes need not be transmitted over the media— they need only be reconstructed at the far end. This method utilizes the spaces provided both by the preamble and IPG to convey framing data over the media.

Figure 1:
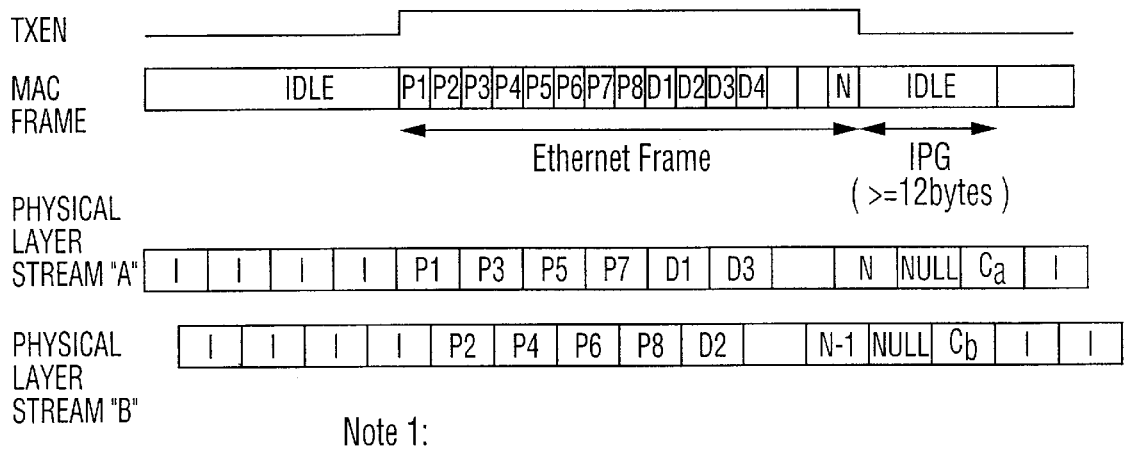
FIG. 1 is a schematic diagram showing the Ethernet frame to physical layer stream mapping.

As illustrated in FIG. 1, an incoming Ethernet frame is first separated on a byte by byte basis into two byte streams A and B.

The proposed coding scheme allows for a 2x compression of the line rate by using 2B1Q line coding which maps 2 bits into one of 4 possible levels. The addition of a zero state (null) allows the definition of an escape sequence. Grey coding of the bits, which limits the change to 1 bit in going from one count to the next, limits single bit error propagation on the symbols. The mapping of the bits into symbols, and subsequent experimental voltage levels are illustrated below.

| Bits | Symbol | Level (mv) |
| --- | --- | --- |
| 10 | +3 | 450 |
| 11 | +1 | 150 |
| NULL | 0 | 0 |
| 01 | −1 | −150 |
| 00 | −3 | −450 |

Figure 2:
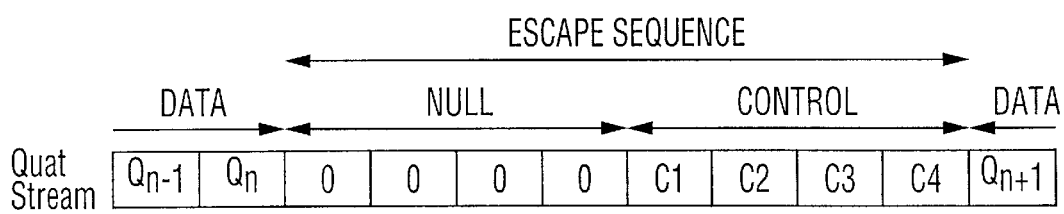
FIG. 2 is a schematic diagram of the escape code sequence.

The NULL (or ESC) denotes the start of an escape sequence. The escape sequence consists of the ESC plus four additional quats. Since there are four quats to a byte, the NULL plus the four additional quats uses up 2 bytes. As shown in FIG. 2, escape sequences are denoted by "N+x", where N stands for NULL and "x" stands for the four additional quats.

Examples of escape sequences that might be used are the following:

S—Start of Packet
T—End of Packet
R—Carrier Extension
H—Error codes
F—Link Not Available
C—Link Configuration
I—Idle With the exception of start/end of packet, the meanings of the above control codes are not relevant to the method described here, and are shown only to illustrate that the method is capable of supporting various control codes in band with the data.

Pattern Substitution Escape Sequences

Scrambling using a pseudo random syndrome generator normally is used to ensure a reasonable amount of data randomization. This has the effect of minimizing long fixed pattern sequences which would result in long intervals of fixed quats being transmitted. Data transitions are required periodically for clock recovery circuits and to avoid baseline wander in the receiver. However, scrambling provides only statistically guaranteed transitions. Particular data patterns that are not random, but mimic the scrambler patterns can still produce fixed transmitted patterns. In addition to scrambling, escape sequences are used here to reduce this problem.

Four binary sequences would cause the transmission of fixed quats. These are all ones, all zeros, an alternating pattern of ones and zeros, or an alternating pattern of zeros and ones. These would map to +1, −3, +3 and −1, respectively.

By temporarily storing data in a shift register before transmission down the cable, the transmitter can search the data in the shift register for one of the above fixed 16-bit patterns. On detection of such a pattern, the transmitter will substitute for the detected 8-quat word a 4-quat NULL and an associated 4-quat control code representing one of the substituted patterns. This pattern matching will imply an inherent 16-bit delay in both the transmitter and the receiver. By using such escape sequences the transmission of long intervals of fixed quats is reduced. Obviously, another shift register must be used on the receiving end to delay the data received to detect the escape sequences and allow substitution with the corresponding fixed quats.

Escape Sequence and Physical Layer Streams

All data will be scrambled prior to being transmitted onto the physical media. Escape sequences are added after scrambling, overwriting the previously scrambled bits. These overwritten scrambled bits are regenerated later in the receiver at the far end.

FIG. 3 shows how the physical codes actually map to a physical layer stream. Note that an escape sequence is used to define a transition from one "phase" to another such as start of packet, end of packet, carrier extension, error codes, etc. For example, an "N+P" escape sequence is used to overwrite the first 2 bytes of the preamble to indicate start of packet. The remaining packet bytes are considered normal data. End of packet is indicated by a transition from the packet "P" state to either the idle "I" state or the carrier extension "R" state. Any other escape sequence would be invalid. At any time, pattern substitution may apply, should there be a long interval of fixed quats being transmitted, by using an "N+Sxx" escape sequence. The component Sxx denotes substitution of an "xx" quat pattern in the second byte of the escape sequence for a quat sequence that would otherwise be fixed. Also note that all escape sequences are 2 bytes in length.

Each of the 4 regularly repeating patterns (F, I, R, H) have a unique pre-scramble 16-bit pattern, which is transmitted after each of the escape sequences indicating a change in "phase" or state. This improves error performance by allowing a check on the control data following an escape sequence.

Data following an N+C escape sequence consists of a 16-bit "configuration register" (Ethernet specific) denoted as "C". The data after an N+P escape sequence will consist of packet data "P".

FIG. 3 illustrates two examples of streams. The first stream contains a packet with no carrier extension quats "R", and the second stream has carrier extension quats "R". Carrier extension is a required function for Ethernet links when propagation time is greater than the collision diameter time (e.g. gigabit speed Ethernet). It is mentioned here purely to illustrate how 4LZS coding is able to support a variety of in band signaling options.

Escape Sequence Mappings

Figure 5:
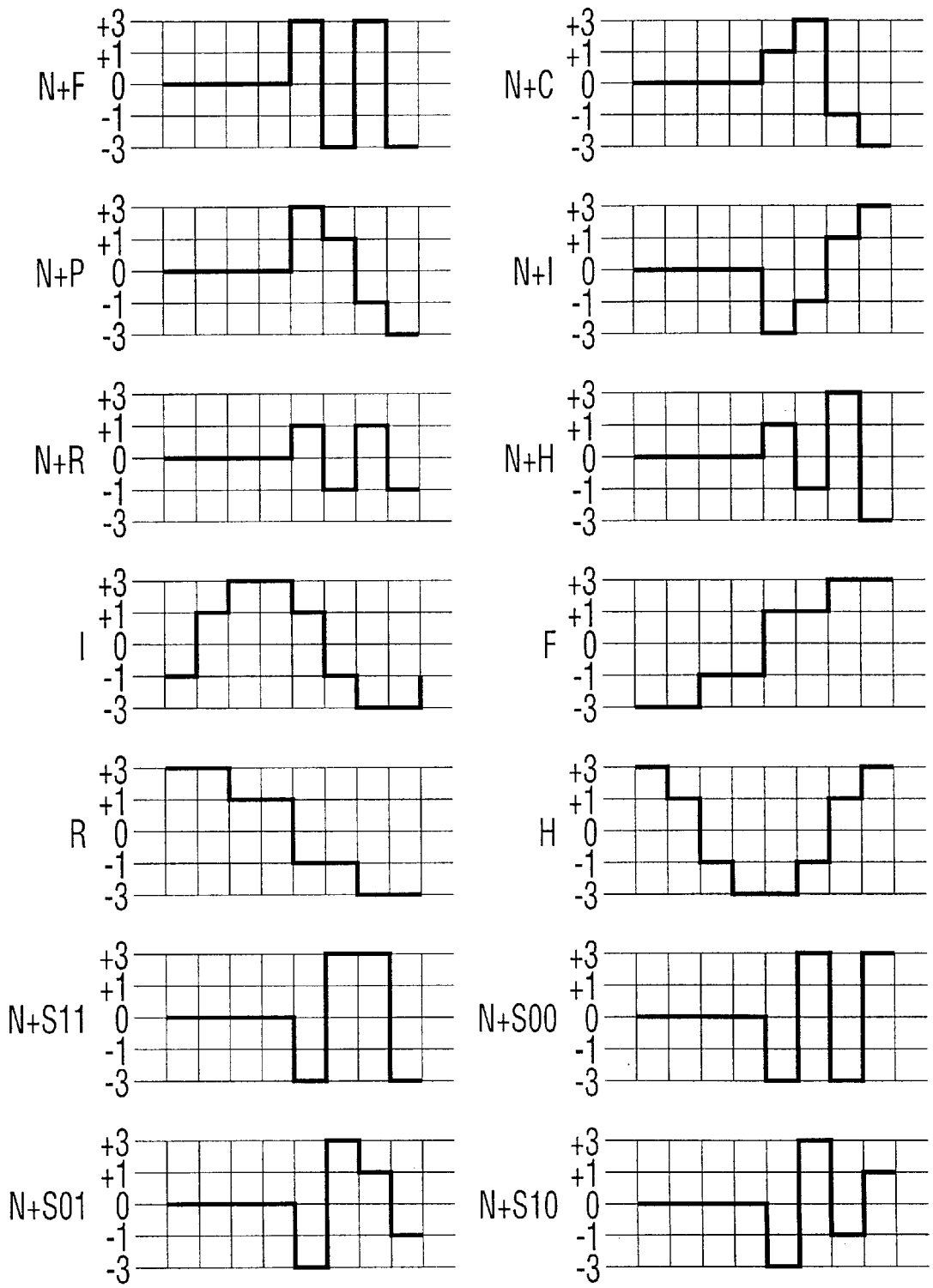
FIG. 5 is a mapping of quat domain representation of the escape sequences.

FIG. 4 illustrates possible mappings for the escape sequences defined not only for framing and link control, but also for the pattern substitution. Note that codes which are escaped using a NULL are denoted as "N+x", where x is the "phase" identifier. The mappings for the escaped sequences defined in FIG. 4 are illustrated in FIG. 5.

The invention is primarily intended to be used to transmit Ethernet frames at gigabit speeds over multiple pairs of UTP-5 cable over distances up to around 100 m. However, this invention is not necessarily restricted to Ethernet frames, nor UTP-5 cable, and is not restricted in itself by distance, which is limited only for a given Signal to Noise Ratio (SNR).

Alternative media such as coaxial cable may equally be used using this method.

Other packet oriented protocols may be supported over UTP-5 using this method, such as Point to Point Protocol (PPP), High speed Digital Subscriber Loop (HDSL), or High level Data Link Control (HDLC).

Figure 6:
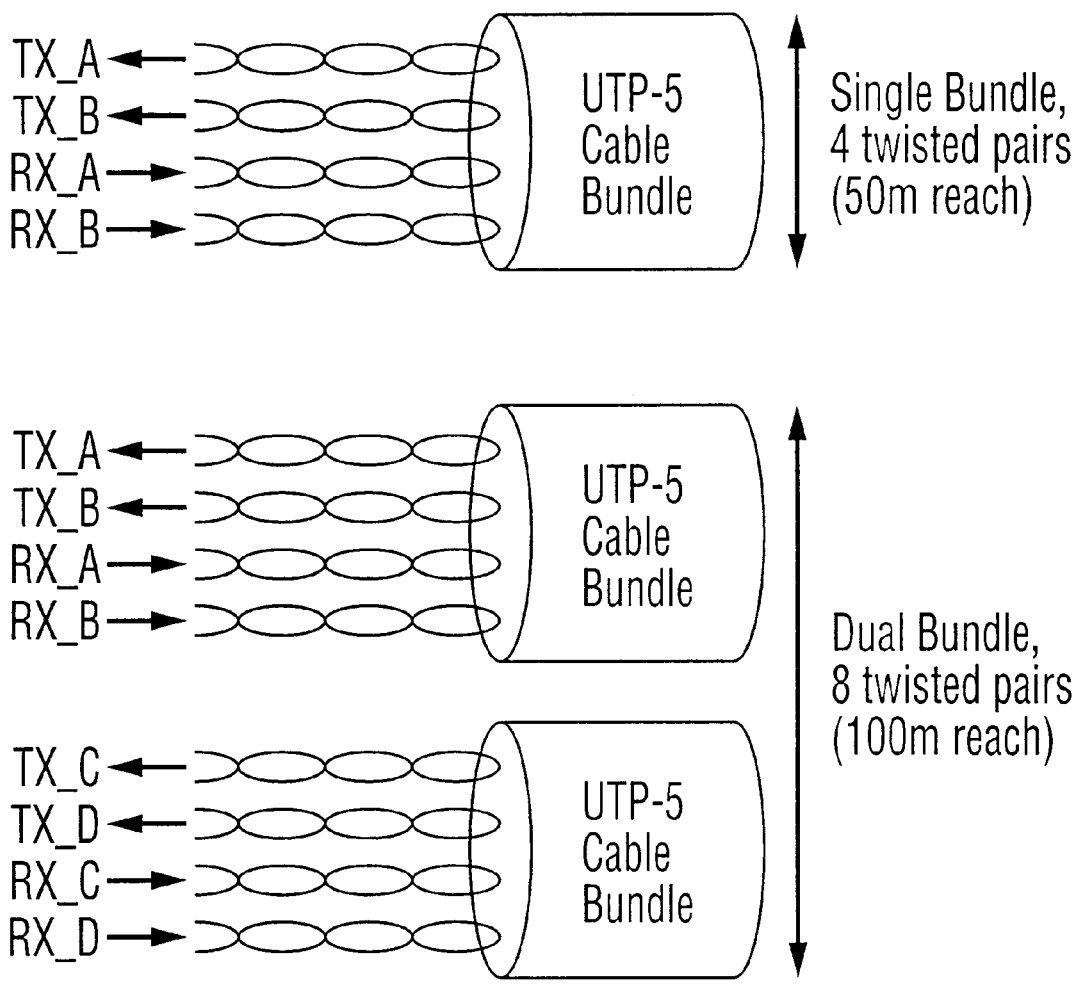
FIG. 6 is a schematic diagram showing operation with standard single or dual UTP-5 cable bundles.

The method also lends itself to scaling over multiple UTP-5 cables to increase the overall maximum reach. This may be achieved by transmitting data at a reduced rate over more pairs. One example of this would be to use 2 UTP-5 cables, each cable containing 4-pairs. By utilizing 4 pairs for transmit and 4 pair for receive, and by transmitting at 125 MBaud on each of the 4 pairs, a 1 Gbps full duplex data rate could be attained with a reach of up to 100 m. This is illustrated in FIG. 6 below.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of signal coding that permits high speed data transmission over multiple pairs of UTP-5 cable from a transmission end to a receiving end, comprising:

at the transmission end:
(a) separating an incoming frame of data into a plurality of byte streams with a predefined sequence of bytes assigned to each of said streams;
(b) encoding every 2 bits of data in each stream into one of 4 logical voltage levels forming a symbol or quat thereby reducing the symbol or baud rate by 50%; and
(c) inserting an escape sequence into one or more of the streams consisting of a sequence of zero's followed by a control code to indicate a transition from one state to another;

at a receiving end:
(d) reading said escape sequence; and
(e) decoding said streams in accordance with the code contained in said escape sequence.

2. A method according to claim 1, wherein the escape sequence is inserted by overwriting bits of a frame being transmitted.

3. A method according to claim 1, wherein said escape sequence includes four zeros followed by four quats.

4. A method according to claim 1, wherein an incoming frame is separated on a byte-by-byte basis with each successive byte assigned to a different stream than the previous byte.

5. A method according to claim 1, wherein said escape sequence is used to delineate a start of a frame from data in the frame itself.

6. A method according to claim 1, wherein said escape sequence is used to delineate an end of a frame from data in the frame itself.

7. A method according to claim 1, wherein said escape sequence is substituted in place of intervals of fixed quats where the interval of the sequence of transmission of fixed quats is sufficiently long so as to affect clock recovery circuits or to cause significant baseline wander or both.

8. A method according to claim 1, wherein the frames of data are Ethernet frames.

9. A method of signal coding that permits high speed data transmission over multiple pairs of UTP-5 cable from a transmission end to a receiving end, comprising:

at the transmission end:
(a) separating an incoming frame of data on a byte-by-byte basis into two byte streams;
(b) encoding every 2 bits of data in each stream into one of 4 logical voltage levels forming a symbol or quat thereby reducing the symbol or baud rate by 50%; and
(c) inserting escape sequences into each stream to indicate a change in state of the data streams said escape sequences each being defined by a null sequence of at least two zeroes followed by selected control codes of at least two additional quats;

at the receiving end:
(d) detecting and reading the escape sequences; and decoding the data in the data streams.

10. A method according to claim 9, wherein said escape sequences each include four zeros followed by four quats.

11. A method according to claim 9, wherein the frame of data transmitted is an Ethernet frame and the escape sequences overwrite preamble bytes at the start of said frame and idle bytes between frames.

12. A method according to claim 9, wherein the bits are Grey coded.

13. A method according to claim 9, wherein the bits are scrambled before adding escape sequences.

14. A method according to claim 9, wherein the escape sequence is inserted by overwriting bits of a frame being transmitted.

15. A method according to claim 9, wherein an incoming frame is separated on a byte-by-byte basis with each successive byte assigned to a different stream than the previous byte.

16. A method according to claim 9, wherein said escape sequence is used to delineate a start of a frame from data in the frame itself.

17. A method according to claim 9, wherein said escape sequence is used to delineate an end of a frame from data in the frame itself.

18. A method according to claim 9, wherein said escape sequence is substituted in place of intervals of fixed quats where the interval of the sequence of transmission of fixed quats is sufficiently long so as to affect clock recovery circuits or to cause significant baseline wander or both.

* * * * *

UNITED STATES PATENT AND TRADEMARK OFFICE
CERTIFICATE OF CORRECTION

PATENT NO.    : 6,088,369
DATED         : July 11, 2000
INVENTOR(S)   : Stephen Dabecki, et al.

It is certified that error appears in the above-identified patent and that said Letters Patent is hereby corrected as shown below:

<u>Column 1,</u>
Lines 29-39, should read as follows:
The use of unshielded twisted pair transmission lines in existing buildings for local area networks (LAN's) and in other areas, has created a need for a technique that will allow the transmission of high speed serial bit streams containing data frames. At present there is a need for a method of coding a 500 Mbps serial bit stream containing data frames into an efficient physical layer stream for subsequent transmission over a single pair of Unshielded Twisted Pair (UTP). For example, transmission of such a stream over a Category 5 cable (UTP-5) twisted pair up to a distance of 50 meters is desired.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*